(12) United States Patent
Lee et al.

(10) Patent No.: US 7,868,867 B2
(45) Date of Patent: Jan. 11, 2011

(54) DISPLAY DEVICE AND DRIVING DEVICE THEREOF

(75) Inventors: Joo-Hyung Lee, Gyeonggi-do (KR); Hyung-Guel Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1118 days.

(21) Appl. No.: 11/272,104

(22) Filed: Nov. 8, 2005

(65) Prior Publication Data

US 2006/0097976 A1     May 11, 2006

(30) Foreign Application Priority Data

Nov. 8, 2004     (KR)     ............. 10-2004-0090377

(51) Int. Cl.
  G09G 3/36     (2006.01)
  G06F 3/041    (2006.01)
  G06F 3/042    (2006.01)

(52) U.S. Cl. .................... 345/98; 345/99; 345/100; 345/173; 345/175

(58) Field of Classification Search ............. 345/87, 345/102
   See application file for complete search history.

(56) References Cited

U.S. PATENT DOCUMENTS

| 5,396,123  A * | 3/1995 | Minamizaki ............. 327/94 |
| 6,028,581  A * | 2/2000 | Umeya ................. 345/104 |
| 7,382,344  B2 * | 6/2008 | Lee et al. ............. 345/99 |
| 7,391,405  B2 * | 6/2008 | Ahn ................... 345/99 |
| 2002/0047847 A1 * | 4/2002 | Tamura ............... 345/534 |
| 2002/0084965 A1 * | 7/2002 | Park ................... 345/87 |
| 2003/0127647 A1 * | 7/2003 | Street et al. .......... 257/59 |
| 2005/0093809 A1 * | 5/2005 | Lim .................. 345/100 |
| 2005/0122827 A1 * | 6/2005 | Wang ................. 365/232 |
| 2005/0243068 A1 * | 11/2005 | Johnson et al. ...... 345/173 |
| 2005/0285822 A1 * | 12/2005 | Reddy et al. .......... 345/76 |
| 2006/0170638 A1 * | 8/2006 | Sloof et al. .......... 345/98 |

FOREIGN PATENT DOCUMENTS

| WO | WO 2004/006008   | * | 1/2004 |
| WO | WO 2004023440    | * | 3/2004 |
| WO | WO 2004023440 A2 | * | 3/2004 |
| WO | 2004/088496      |   | 10/2004 |

* cited by examiner

Primary Examiner—Bipin Shalwala
Assistant Examiner—Benyam Ketema
(74) Attorney, Agent, or Firm—Innovation Counsel LLP

(57) ABSTRACT

A device of driving a display device according to an embodiment of the present invention is provided. The display device includes a plurality of display circuits, a plurality of sensing circuits, and a plurality of data lines connected to the display circuits and the sensing circuits. The driving device includes: an image data driver converting image signals into image data signals and applying the image data signals to a first set of the data lines; a sensing signal processor receiving analog sensor data signals from a second set of the data lines and processing the sensor data signals to generate digital sensor data signals; and a signal controller receiving the image signals from an external device and controlling the image data driver and the sensing signal processor, wherein the image data driver, the sensing signal processor, and the signal controller are integrated in a single integrated circuit chip.

19 Claims, 11 Drawing Sheets

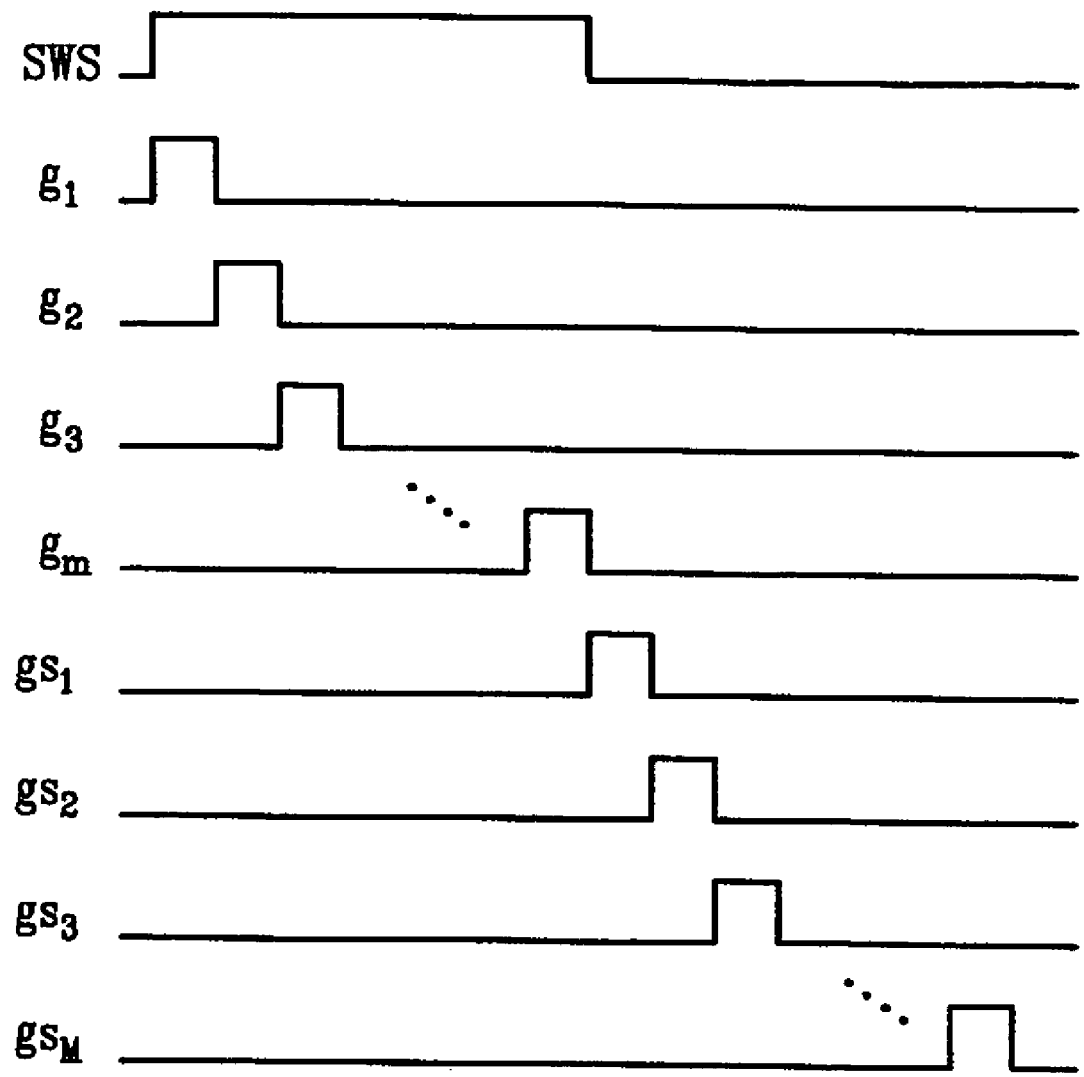

DISPLAY DEVICE AND DRIVING DEVICE THEREOF

BACKGROUND (a) Field of the Invention

The present invention relates to a display device and a driving device thereof.

(b) Description of Related Art

A liquid crystal display (LCD) includes a pair of panels provided with pixel electrodes and a common electrode and a liquid crystal layer with dielectric anisotropy interposed between the panels. The pixel electrodes are arranged in a matrix and connected to switching elements such as thin film transistors (TFTs) such that the pixel electrodes receive image data voltages row by row. The common electrode covers the entire surface of one of the two panels and is supplied with a common voltage. A pixel electrode, a corresponding portion of the common electrode, and a corresponding portion of the liquid crystal layer form a liquid crystal capacitor. These components together with a switching element connected thereto form the basic elements of a pixel.

An LCD generates electric fields by applying voltages to pixel electrodes and a common electrode. The strength of the electric fields are varied to adjust the transmittance of light passing through the liquid crystal layer, thereby displaying images.

Recently, an LCD incorporating sensors has been developed. The sensors sense the change of pressure or incident light caused by a touch of a finger or a stylus and provide electrical signals corresponding to the detected change in pressure or light. The LCD determines whether and where a touch exists based on the electrical signals. The LCD sends the information regarding the touch to an external device. The external device may return image signals to the LCD, which are generated based on the information. Although the sensors may be provided on an external device such as a touch screen panel to be attached to the LCD, it may increase the thickness and the weight of the LCD and it may make it difficult to represent minute characters or pictures.

A sensor incorporated into an LCD may be implemented as a thin film transistor (TFT) disposed in a pixel for displaying an image. However, a reader for reading the output signals of the sensors is attached to the LCD panel, thereby increasing the size of the panel and the manufacturing cost thereof.

SUMMARY

A device for driving a display device according to an embodiment of the present invention is provided. The display device includes a plurality of display circuits, a plurality of sensing circuits, and a plurality of data lines connected to the display circuits and the sensing circuits. The driving device includes: an image data driver converting image signals into image data signals and applying the image data signals to a first set of the data lines; a sensing signal processor receiving analog sensor data signals from a second set of the data lines and processing the sensor data signals to generate digital sensor data signals; and a signal controller receiving the image signals and controlling the image data driver and the sensing signal processor, wherein the image data driver, the sensing signal processor, and the signal controller are integrated in a single integrated circuit chip.

A display device according to an embodiment of the present invention includes: a plurality of display circuits displaying images; a plurality of sensing circuits sensing physical quantity; a plurality of data lines connected to the display circuits and the sensing circuits; an image data driver converting image signals into image data signals and applying the image data signals to a first set of the data lines; a sensing signal processor receiving analog sensor data signals from a second set of the data lines and processing the sensor data signals to generate digital sensor data signals; and a signal controller receiving the image signals and controlling the image data driver and the sensing signal processor, wherein the image data driver, the sensing signal processor, and the signal controller are integrated in a single integrated circuit chip.

The sensing signal processor may include: a plurality of amplifiers amplifying the analog sensor data signals; a sample and hold circuit filtering the amplified analog sensor data signals and performing a sample-and-hold operation on the filtered analog sensor data signals; and an analog-to-digital converter converting the analog sensor data signals into the digital sensor data signals.

The driving device may further include a parallel-to-serial converter converting the analog sensor data signals from the sample and hold circuit.

The image data driver may include a plurality of output buffers outputting the image data signals.

The driving device may further include a switching unit coupled to the data lines and selectively connecting the data lines to either of the amplifiers and the output buffers.

The first set of data lines may comprise image data lines that are connected between the display circuits and the image data driver, and the second set of data lines may comprise sensor data lines that are connected between the sensing circuits and the sensing signal processor.

The amplifiers may be coupled to input terminals of the integrated circuit chip and the output buffers may be coupled to output terminals of the integrated circuit chip. The input terminals and at least two of the output terminals of the integrated circuit chip may be alternately arranged.

The driving device may further include an image scanning driver integrated into the integrated circuit chip and supplying image scanning signals to the display circuits.

The driving device may further include a sensor scanning driver integrated into the integrated circuit chip and supplying sensor scanning signals to the sensing circuits.

The sensing circuits may include photo sensing circuits and pressure sensing circuits that sense a touch.

A distance between two adjacent sensor data lines may be from about 0.1 mm to about 5.0 mm.

BRIEF DESCRIPTION OF THE DRAWINGS

The present invention will become more apparent by describing embodiments thereof in detail with reference to the accompanying drawings in which:

FIGS. 10A and 10B are exemplary timing charts illustrating various signals of an LCD including a complex IC chip.

DETAILED DESCRIPTION OF THE PREFERRED EMBODIMENTS

Figure 1:
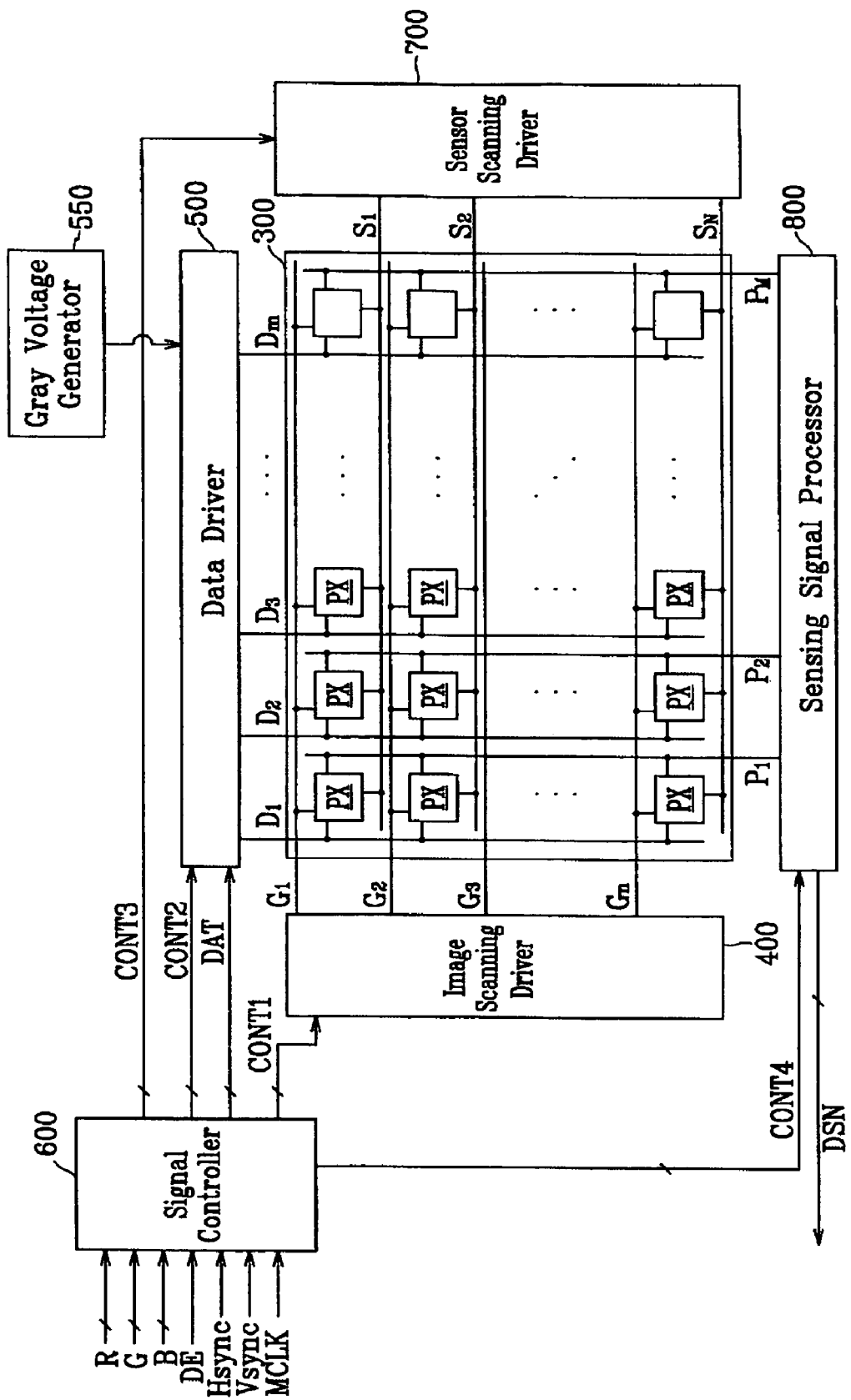
FIG. 1 is a block diagram of an LCD according to an embodiment of the present invention.

The present invention will be described more fully hereinafter with reference to the accompanying drawings, in which preferred embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A liquid crystal display according to an embodiment of the present invention will be described in detail below with reference to FIGS. 1, 2, 3, 4, and 5, as an example of a touch detectable display device.

Figure 2:
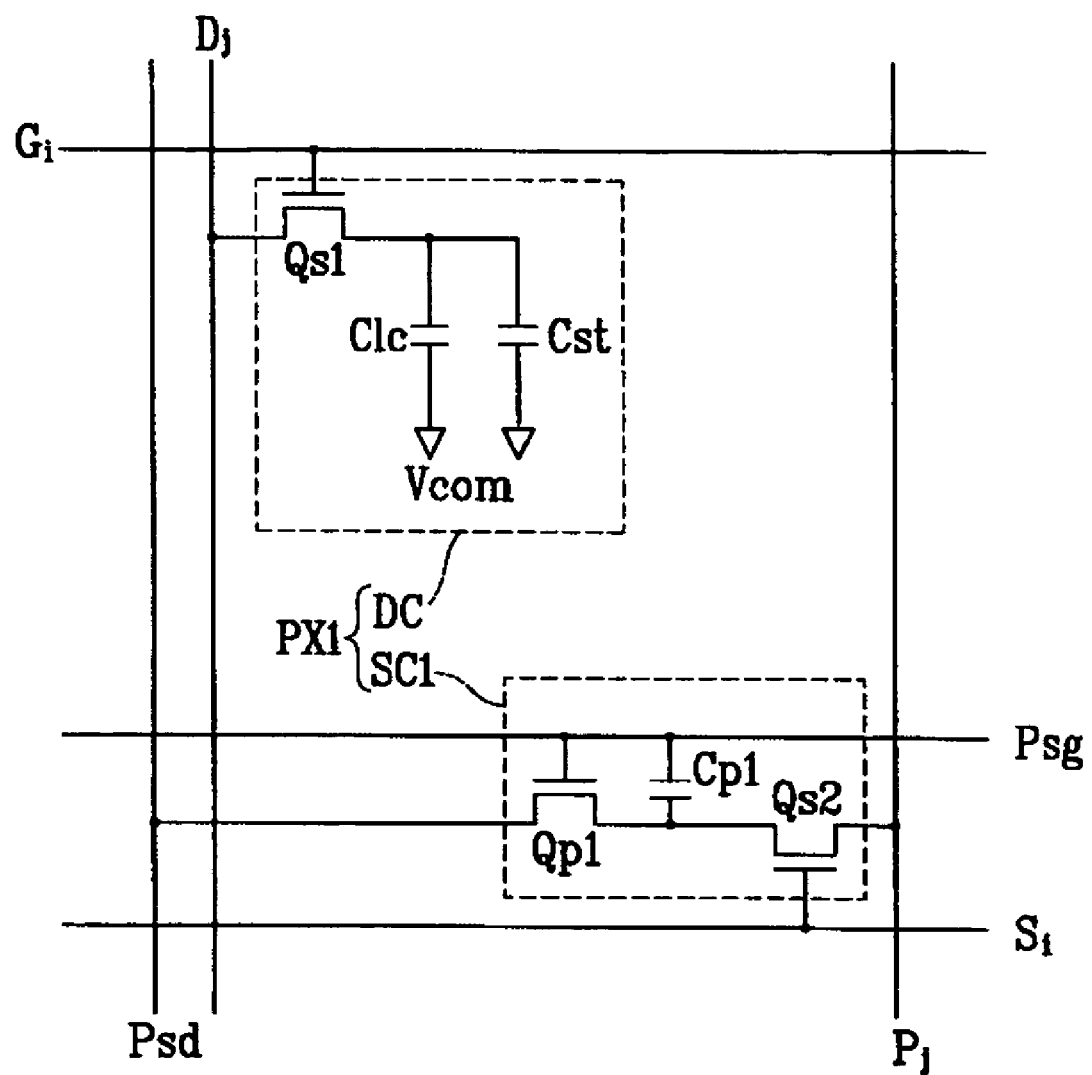
FIG. 2 is an equivalent circuit diagram of a pixel including a photo sensing circuit of an LCD according to an embodiment of the present invention.
Figure 3:
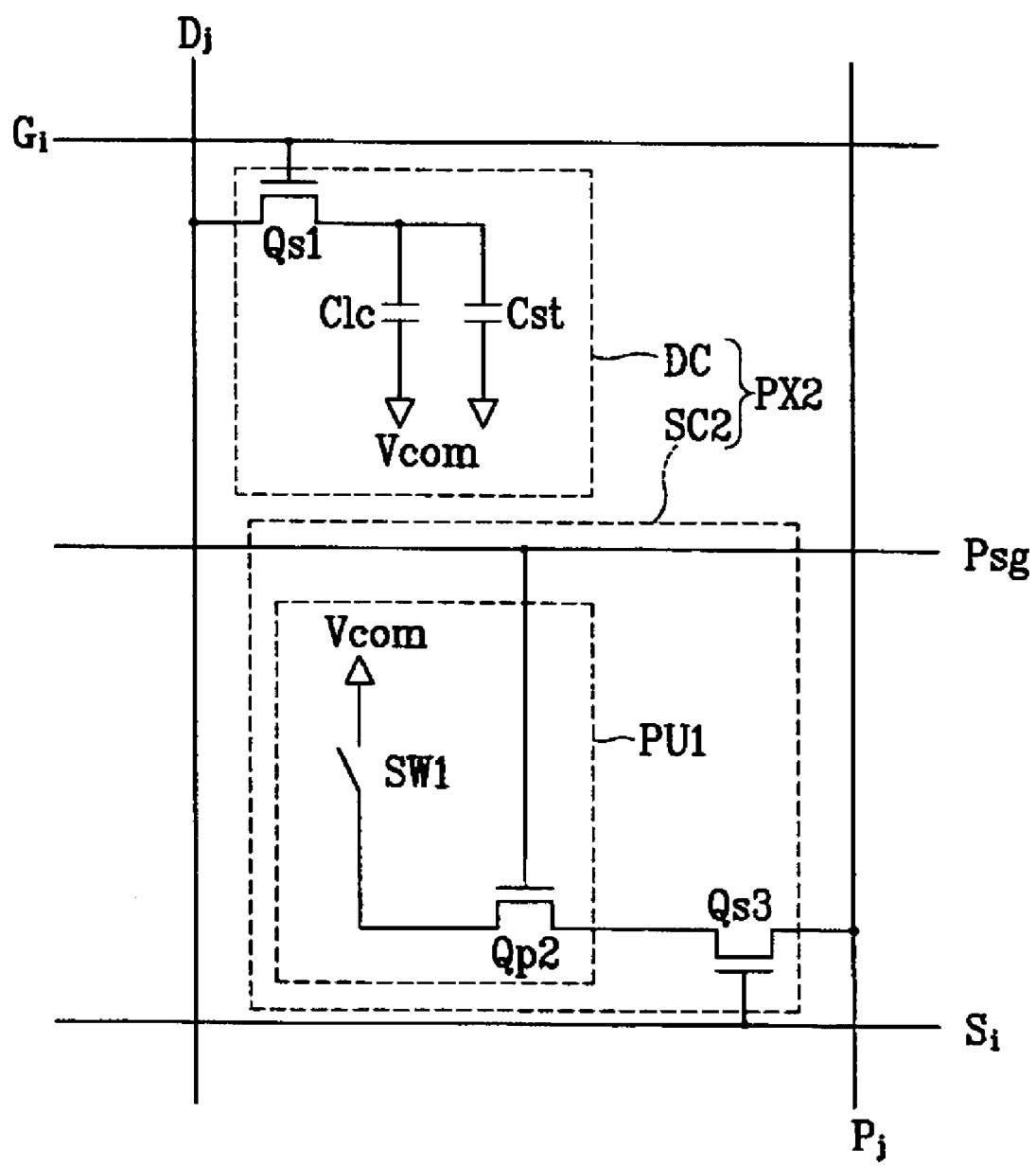
FIG. 3 is an equivalent circuit diagram of a pixel including a pressure sensing circuit of an LCD according to an embodiment of the present invention.
Figure 4:
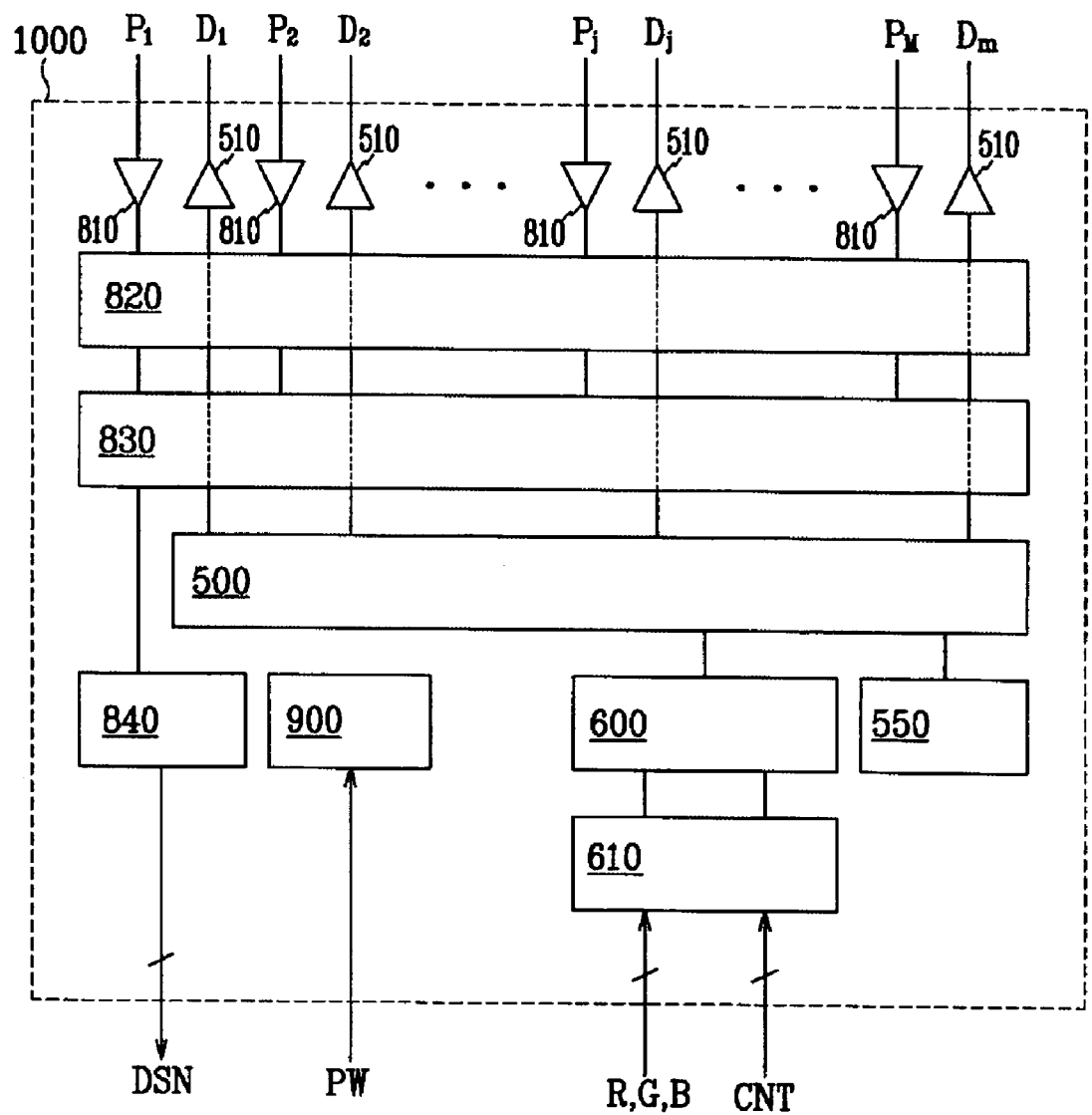
FIG. 4 is a block diagram of a complex integrated circuit (IC) including a driving device of an LCD according to an embodiment of the present invention.
Figure 5:
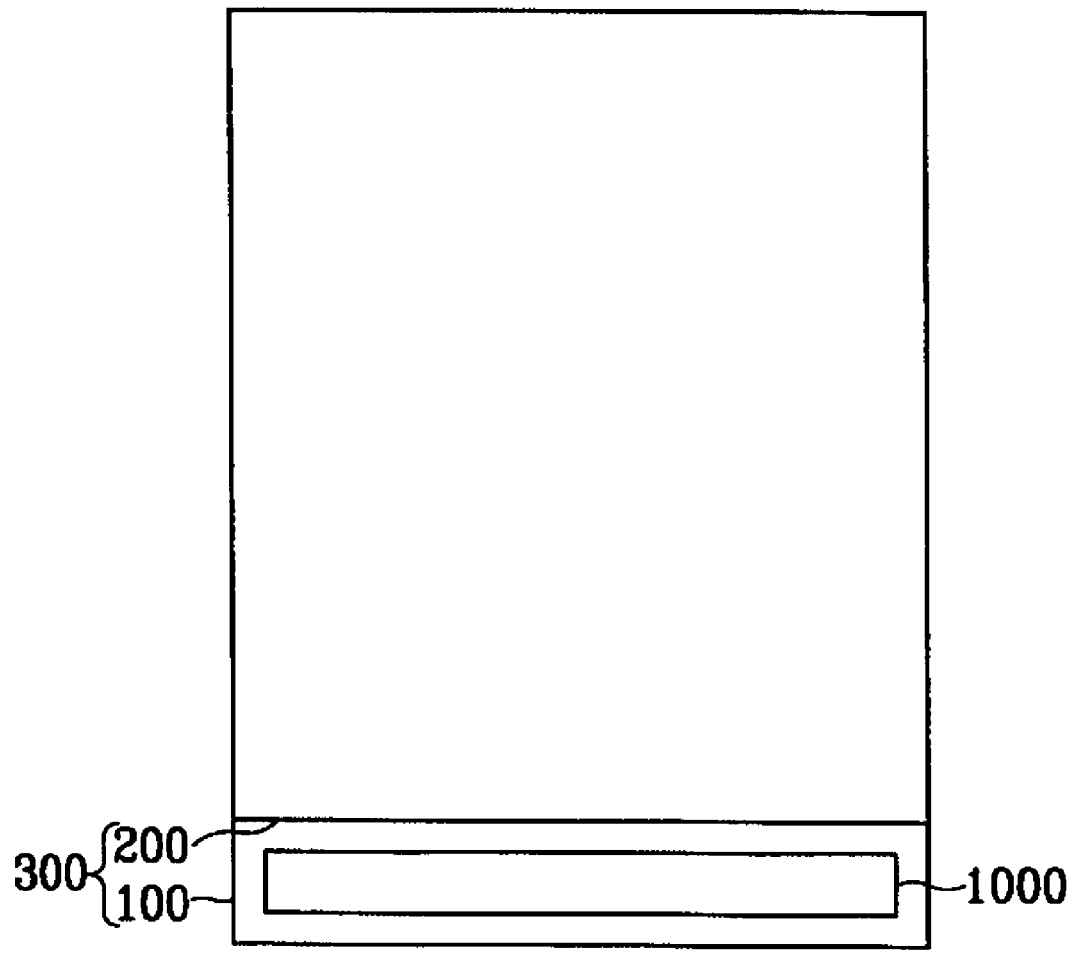
FIG. 5 is a schematic plan view of an LCD including a complex IC chip disposed on a panel.

FIG. 1 is a block diagram of an LCD according to an embodiment of the present invention. FIG. 2 is an equivalent circuit diagram of a pixel including a photo sensing circuit of an LCD according to an embodiment of the present invention. FIG. 3 is an equivalent circuit diagram of a pixel including a pressure sensing circuit of an LCD according to an embodiment of the present invention. FIG. 4 is a block diagram of a complex integrated circuit (IC) including a driving device of an LCD according to an embodiment of the present invention. FIG. 5 is a schematic plan view of an LCD including a complex IC chip disposed on a panel.

Referring to FIG. 1, an LCD according to an embodiment includes a liquid crystal (LC) panel assembly 300, an image scanning driver 400, an image data driver 500, a sensor scanning driver 700, and a sensing signal processor 800 that are coupled with the panel assembly 300, a gray voltage generator 550 coupled to the image data driver 500, and a signal controller 600 controlling the above elements.

Referring to FIGS. 1-3, the panel assembly 300 includes a plurality of display signal lines $G_1$-$G_n$ and $D_1$-$D_m$, a plurality of sensor signal lines $S_1$-$S_N$, $P_1$-$P_M$, Psg, and Psd, and a plurality of pixels PX. The pixels PX are connected to the display signal lines $G_1$-$G_n$ and $D_1$-$D_m$ and the sensor signal lines $S_1$-$S_N$, $P_1$-$P_M$, Psg and Psd and arranged substantially in a matrix.

The display signal lines include a plurality of image scanning lines $G_1$-$G_n$ transmitting image scanning signals and a plurality of image data lines $D_1$-$D_m$ transmitting image data signals.

The sensor signal lines include a plurality of sensor scanning lines $S_1$-$S_N$ transmitting sensor scanning signals, a plurality of sensor data lines $P_1$-$P_M$ transmitting sensor data signals, a plurality of control voltage lines Psg transmitting a sensor control voltage, and a plurality of input voltage lines Psd transmitting a sensor input voltage.

The image scanning lines $G_1$-$G_n$ and the sensor scanning lines $S_1$-$S_N$ extend substantially in a row direction and substantially parallel to each other, while the image data lines $D_1$-$D_m$ and the sensor data lines $P_1$-$P_M$ extend substantially in a column direction and substantially parallel to each other. It is preferable that the distance between two adjacent sensor data lines $P_1$-$P_M$ is from about 0.1 mm to about 5.0 mm.

Referring to FIGS. 2 and 3, each pixel PX, for example, a pixel PX1 or PX2 in the i-th row (i=1, 2, ..., n) and the j-th column (j=1, 2, ..., m) includes a display circuit DC connected to display signal lines $G_i$ and $D_j$ and a photo sensing circuit SC1 connected to sensor signal lines $S_i$, $P_j$, Psg and Psd or a pressure sensing circuit SC2 connected to sensor signal lines $S_i$, $P_j$ and Psg. In some embodiments, not all of the pixels PX in the LC panel assembly 300 include the sensing circuits SC1 or SC2. In other words, the concentration of the sensing circuits SC1 and SC2 may vary. Thus, the number N of the sensor scanning lines $S_1$-$S_N$ and the number M of the sensor data lines $P_1$-$P_M$ may vary.

For example, in some embodiments, the resolution of the LCD is equivalent to QVGA (quarter video graphics array) having 240×320 dots, with each dot corresponding to three pixels PX. When the resolution of the sensing circuits SC1 and SC2 is equivalent to QVGA, one sensing circuit is assigned to every three pixels PX. When the resolution of the sensing circuits SC1 and SC2 is equivalent to QQVGA (quarter QVGA) having 120×160 dots, one sensing circuit is assigned to every twelve pixels PX. Here, one dot is a basic unit for representing a color and includes a set of three pixels, for example, red, green, and blue pixels.

The sensing circuits SC1 and SC2 may be separated from the pixels PX and may be provided between the pixels PX or in a separately prepared area.

The display circuit DC includes a switching element Qs1 connected to an image scanning line $G_i$ and an image data line $D_j$, and a LC capacitor Clc, and a storage capacitor Cst connected to the switching element Qs1. In some embodiments, the storage capacitor Cst may be omitted.

The switching element Qs1 has three terminals, e.g., a control terminal connected to the image scanning line $G_i$, an input terminal connected to the image data line $D_j$, and an output terminal connected to the LC capacitor Clc and the storage capacitor Cst.

The LC capacitor Clc includes a pair of terminals and a liquid crystal layer (not shown) interposed therebetween. The LC capacitor Clc is connected between the switching element Qs1 and a common voltage Vcom. The two terminals of the LC capacitor Clc may be disposed on the two panels (not shown) of the panel assembly 300. One of the two terminals is often referred to as a pixel electrode, and the other of the two terminals is often referred to as a common electrode. The common electrode covers an entire area of one of the two panels and is supplied with a common voltage Vcom.

The storage capacitor Cst assists the LC capacitor Clc and is connected between the switching element Qs1 and a predetermined voltage such as the common voltage Vcom. The storage capacitor Cst may include the pixel electrode and a separate signal line, which is provided on one of the two panels and overlaps the pixel electrode via an insulator. Alternatively, the storage capacitor Cst includes the pixel electrode and an adjacent image scanning line called a previous image scanning line, which overlaps the pixel electrode via an insulator.

For a color display, each pixel PX uniquely represents one of several primary colors (i.e., spatial division) or each pixel PX sequentially represents several primary colors in turn (i.e., temporal division) such that a spatial or temporal sum of the primary colors is recognized as a desired color. For example, the set of primary colors can include red, green, and blue. In an example of the spatial division type of display, each pixel PX includes a color filter representing one of the primary colors in an area facing the pixel electrode 190.

The photo sensing circuit SC1 shown in FIG. 2 includes a photo sensing element Qp1 connected to a control voltage line Psg and an input voltage line Psd, a sensor capacitor Cp1 connected to the photo sensing element Qp1, and a switching element Qs2 connected to a sensor scanning line $S_i$, the photo sensing element Qp1, and a sensor data line $P_j$.

The photo sensing element Qp1 has three terminals: a control terminal connected to the control voltage line Psg to be biased by the sensor control voltage, an input terminal connected to the input voltage line Psd to be biased by the sensor input voltage, and an output terminal connected to the switching element Qs2 and the capacitor Cp1. The photo sensing element Qp1 comprises a photoelectric material that generates a photocurrent upon exposure to light. An example of the photo sensing element Qp1 is a thin film transistor having an amorphous silicon or polysilicon channel that generates a photocurrent. The sensor control voltage applied to the control terminal of the photo sensing element Qp1 is sufficiently low or sufficiently high so as to keep the photo sensing element Qp1 in an off state when no incident light is detected. The sensor input voltage applied to the input terminal of the photo sensing element Qp1 is sufficiently high or sufficiently low to keep the photocurrent flowing in a single direction. The sensor input voltage causes the photocurrent to flow toward the switching element Qs2. In addition, the photocurrent also flows into the sensor capacitor Cp1 to charge the sensor capacitor Cp1.

The sensor capacitor Cp1 is connected between the control terminal and the output terminal of the photo sensing element Qp1. The sensor capacitor Cp1 stores electrical charges output from the photo sensing element Qp1 to maintain a predetermined voltage. In other embodiments, the sensor capacitor Cp1 may be omitted.

The switching element Qs2 also has three terminals: a control terminal connected to the sensor scanning line $S_i$, an input terminal connected to the output terminal of the photo sensing element Qp1, and an output terminal connected to the sensor data line $P_j$. The switching element Qs2 outputs a sensor output signal to the sensor data line $P_j$ in response to the sensor scanning signal from the sensor scanning line $S_i$. The sensor output signal from the switching element Qs2 is a sensing current from the photo sensing element Qp1 or a current driven by the voltage stored in the sensor capacitor Cp1.

The pressure sensing circuit SC2 shown in FIG. 3 includes a pressure sensing element PU1 connected to the common voltage Vcom and a control voltage line Psg, and a switching element Qs3 connected to a sensor scanning line $S_i$, the pressure sensing element PU1, an d a sensor data line $P_j$.

The pressure sensing element PU1 includes a pressure switch SW1 connected to the common voltage Vcom and a driving transistor Qp2 connected between the switch SW1 and the switching element Qs3.

The pressure applied to the pressure switch SW1 caused by a touch exerted on the panel assembly 300 causes the pressure switch SW1 to connect the driving transistor Qp2 to the common voltage Vcom. For example, the pressure may make an electrode (not shown) supplied with the common voltage Vcom approach a terminal of the driving transistor Qp2 to be in contact therewith. Alternatively, the switch SW1 may use another physical mechanism for connecting the driving transistor Qp2 to the common voltage Vcom.

The driving transistor Qp2 has three terminals: a control terminal connected to the control voltage line Psg to be biased by the sensor control voltage, an input terminal connected to the switch SW1, and an output terminal connected to the switching element Qs3. The driving transistor Qp2 generates and outputs an electrical current upon receipt of the common voltage Vcom from the switch SW1.

The switching element Qs3 also has three terminals: a control terminal connected to the sensor scanning line $S_i$, an input terminal connected to the output terminal of the driving transistor Qp2, and an output terminal connected to the sensor data line $P_j$. The switching element Qs3 outputs the current from the driving transistor Qp2 to the sensor data line $P_j$ as a sensor output signal in response to the sensor scanning signal from the sensor scanning line $S_i$.

The switching elements Qs1, Qs2 and Qs3, the photo sensing element Qp1, and the driving transistor Qp2 may comprise amorphous silicon or polysilicon thin film transistors (TFTs).

The pressure sensing circuit SC2 can correctly identify the existence of a touch, but may not effectively identify the precise position of the touch since the pressure applied by the touch may cover a wide area. In contrast, the photo sensing circuit SC1 can identify the precise position of a touch of an object by sensing the variation of light illuminance caused by a shadow of the object. However, photo sensing circuit SC1 may not correctly identify the existence of the touch since the variation of illuminance can be generated by various causes other than a touch. For example, an object disposed near the panel assembly 300 but does not touch the panel assembly 300 may vary the light illuminance.

One or more polarizers (not shown) are provided at the panel assembly 300.

The gray voltage generator 550 generates two sets of gray voltages related to the transmittance of the pixels. The gray voltages in a first set have a positive polarity with respect to the common voltage Vcom, while the gray voltages in a second set have a negative polarity with respect to the common voltage Vcom.

The image scanning driver 400 is connected to the image scanning lines $G_1$-$G_n$ of the panel assembly 300 and synthesizes a gate-on voltage and a gate-off voltage for generating the image scanning signals for application to the image scanning lines $G_1$-$G_n$.

The image data driver 500 is connected to the image data lines $D_1$-$D_m$ of the panel assembly 300 and applies image data signals selected from the gray voltages to the image data lines $D_1$-$D_m$.

The sensor scanning driver 700 is connected to the sensor scanning lines $S_1$-$S_N$ of the panel assembly 300 and synthesizes a gate-on voltage and a gate-off voltage to generate the sensor scanning signals for application to the sensor scanning lines $S_1$-$S_n$.

The sensing signal processor 800 is connected to the sensor data lines $P_1$-$P_M$ of the display panel 300 and receives the sensor data signals from the sensor data lines $P_1$-$P_M$. The sensing signal processor 800 converts the analog sensor data signals from the sensor data lines $P_1$-$P_M$ into digital signals to generate digital sensor data signals DSN. The sensor data signals carried by the sensor data lines $P_1$-$P_M$ may comprise current signals and in this case, the sensing signal processor 800 converts the current signals into voltage signals before the analog-to-digital conversion. One sensor data signal carried by one sensor data line $P_1$-$P_M$ at a time may include one sensor output signal from one switching element Qs2 or may include at least two sensor output signals outputted from at least two switching elements Qs2.

The signal controller 600 controls the image scanning driver 400, the image data driver 500, the sensor scanning driver 700, and the sensing signal processor 800.

Each of the processing units 400, 500, 600, 700, and 800 may comprise at least one integrated circuit (IC) chip mounted on the LC panel assembly 300 or on a flexible printed circuit (FPC) film in a tape carrier package (TCP) type, which are attached to the panel assembly 300. Alternatively, at least one of the processing units 400, 500, 600, 700, and 800 may be integrated into the panel assembly 300 along with the signal lines $G_1$-$G_n$, $D_1$-$D_m$, $S_1$-$S_N$, $P_1$-$P_M$, Psg, and Psd, the switching elements Qs1, Qs2, and Qs3, and the photo sensing elements Qp1. Alternatively, all the processing units 400, 500, 600, 700, and 800 may be integrated into a single IC chip. Alternatively, at least one of the processing units 400, 500, 600, 700, and 800 or at least one circuit element in at least one of the processing units 400, 500, 600, 700, and 800 may be disposed outside of the single IC chip.

The data driver 500, the sensing signal processor 800, and the signal controller 600 are integrated into a complex IC 1000 as shown in FIG. 4. The complex IC 1000 may be implemented as a single chip as shown in FIG. 5.

A complex IC 1000 shown in FIG. 4 includes a gray voltage generator 550, an image data driver 500, a plurality of output buffers 510, a plurality of amplifiers 810, a sample and hold circuit 820, a parallel-to-serial converter 830, an analog-to-digital converter 840, an interface 610, a signal controller 600, and a power unit 900. Here, the amplifiers 810, the sample and hold circuit 820, the parallel-to-serial converter 830, the analog-to-digital converter 840, etc., are circuits forming the sensing signal processor 800 shown in FIG. 1. The gray voltage generator 550, the image data driver 500, and the signal controller 600 have substantially the same function as described above and the detailed description thereof will be omitted.

The output buffers 510 are connected to data lines $D_1$-$D_m$, and output image data voltages from the image data driver 500 to the data lines $D_1$-$D_m$.

The amplifiers 810 are connected to sensor data lines $P_1$-$P_M$, and amplify sensor data signals from the sensor data lines $P_1$-$P_M$.

The number of the output buffers 510 is determined by the number of data lines $D_1$-$D_m$. The number of the amplifiers 810 is determined by the number of sensor data lines $P_1$-$P_M$. In the above-described examples, when both the resolutions of the LCD and the sensing circuits are equivalent to QVGA, the number of the output buffers 510 is three times the number of the amplifiers 810. In this case, output terminals of the complex IC 1000 coupled to the output buffers 510 and input terminals of the complex IC 1000 coupled to the amplifiers 810 are alternately arranged in a manner such that one input terminal is provided for every three output terminals. When the resolution of the LCD is equivalent to QVGA, and the resolution of the sensing circuits C1 and C2 is equivalent to QQVGA, with one input terminal provided for every six output terminals. However, the arrangement of the output terminals and the input terminals of the complex IC 1000 in association with the output buffers 510 and the amplifiers 810 may be varied depending on the arrangement of the sensing circuits C1 and C2.

The sample and hold circuit 820 filters signals from the amplifier 810 and sample-and-holds the filtered signals.

The parallel-to-serial converter 830 converts parallel signals from the sample and hold circuit 820 into serial signals. The parallel-to-serial converter 830 may include a shift register.

The analog-to-digital converter 840 converts the serial sensor data signals from the parallel-to-serial converter 830 into digital sensor data signals DSN.

The interface 610 receives input image signals R, G, and B and input control signals CNT from an external device and converts the received image signals R, G, and B and control signal CNT into a format to be processed by the signal controller 600 and other components.

The power unit 900 supplies power PW to the complex IC 1000.

The integration of the processing units 500, 600, 800, and 900 into the complex IC 1000 may decrease the size of the panel assembly 300, the power consumption, and the manufacturing cost.

At least one of the processing units 500, 600, 800, and 900 or at least one circuit element in at least one of the processing units 500, 600, 800, and 900 may be disposed separate from the single IC chip. In some embodiments, the image scanning driver 400 and/or the sensor scanning driver 700 may be also incorporated into the complex IC 1000. The complex IC 1000 may further include latches, registers, or memories for display operation and sensing operation.

Referring to FIG. 5, the complex IC 1000 may be mounted on the panel assembly 300 in a form of chip. The panel assembly 300 may comprise a lower panel 100 and an upper panel 200. The upper panel 200 may have a smaller surface area than the lower panel 100 such that a portion of the surface area of the lower panel 100 where the complex IC chip 1000 is mounted is exposed. The pixels PX and most parts of the signal lines $G_1$-$G_n$, $D_1$-$D_m$, $S_1$-$S_N$, $P_1$-$P_M$, Psg, and Psd are disposed in an area where the lower panel 100 and the upper panel 200 overlap each other.

The operation of the above-described LCD will be described in detail below.

The signal controller 600 is supplied with input image signals R, G, and B and input control signals CNT for controlling the display thereof from an external graphics controller (not shown). The input control signals CNT include a vertical synchronization signal Vsync, a horizontal synchronization signal Hsync, a main clock MCLK, and a data enable signal DE.

On the basis of the input control signals CNT and the input image signals R, G, and B, the signal controller 600 processes the image signals R, G and B suitable for the operation of the display panel 300 and generates image scanning control signals CONT1, image data control signals CONT2, sensor scanning control signals CONT3, and sensor data control signals CONT4. The signal controller 600 sends the scanning control signals CONT1 to the image scanning driver 400, the processed image signals DAT and the data control signals CONT2 to the image data driver 500, the sensor scanning control signals CONT3 to the sensor scanning driver 700, and the sensor data control signals CONT4 to the sensing signal processor 800.

The image scanning control signals CONT1 include an image scanning start signal STV for indicating the start of image scanning and at least one clock signal for controlling the output time of the gate-on voltage. The image scanning control signals CONT1 may include an output enable signal OE for defining the duration of the gate-on voltage.

The image data control signals CONT2 include a horizontal synchronization start signal STH for indicating the start of image data transmission for a group of pixels PX, a load signal LOAD for controlling the application of the image data signals to the image data lines $D_1$-$D_m$, and a data clock signal HCLK. The image data control signal CONT2 may further include an inversion signal RVS for reversing the polarity of the image data signals (with respect to the common voltage Vcom).

Responsive to the image data control signals CONT2 from the signal controller 600, the image data driver 500 receives a packet of the digital image signals DAT for the group of pixels PX from the signal controller 600. The image data driver 500 converts the digital image signals DAT into analog image data signals and applies the analog image data signals to the image data lines $D_1$-$D_m$.

The image scanning driver 400 applies the gate-on voltage to an image scanning line $G_1$-$G_n$ in response to the image scanning control signals CONT1 from the signal controller 600, thereby turning on the switching transistors Qs1 connected thereto. The image data signals applied to the image data lines $D_1$-$D_m$ are then supplied to the display circuit DC of the pixels PX through the activated switching transistors Qs1.

The difference between the voltage of an image data signal and the common voltage Vcom is represented as a voltage across the LC capacitor Clc, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts the light polarization into the light transmittance for displaying images.

By repeating this procedure by a unit of a horizontal period (also referred to as "1H" and equal to one period of the horizontal synchronization signal Hsync and the data enable signal DE), all image scanning lines $G_1$-$G_n$ are sequentially supplied with the gate-on voltage, thereby applying the image data signals to all pixels PX to display an image for a frame.

When the next frame starts after one frame finishes, the inversion control signal RVS applied to the image data driver 500 is controlled such that the polarity of the image data signals is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

In the meantime, the sensor scanning driver 700 applies the gate-on voltage to the sensor scanning lines $S_1$-$S_N$ to turn on the switching elements Qs2 and Qs3 connected thereto in response to the sensing control signals CONT3. Then, the switching elements Qs2 and Qs3 output sensor output signals to the sensor data lines $P_1$-$P_M$ to form sensor data signals, and the sensor data signals are inputted into the sensing signal processor 800.

The sensor data signals are amplified to have suitable levels by the amplifiers 810. Next, the signals are filtered and sample-and-held by the sample and hold circuit 820. The sample-and-held sensor data signals are converted into serial signals by the parallel-to-serial converter 830, and the parallel analog sensor data signals are then converted into digital sensor data signals DSN by the analog-to-digital converter 840 to be sent to an external device. The external device appropriately processes the digital sensor data signals DSN to determine whether and where a touch exists. The external device sends image signals generated based on information about the touch to the LCD.

A touch detectable liquid crystal display according to another embodiment of the present invention will be described in detail below with reference to FIGS. 6, 7, 8, 9, 10A, and 10B.

Figure 6:
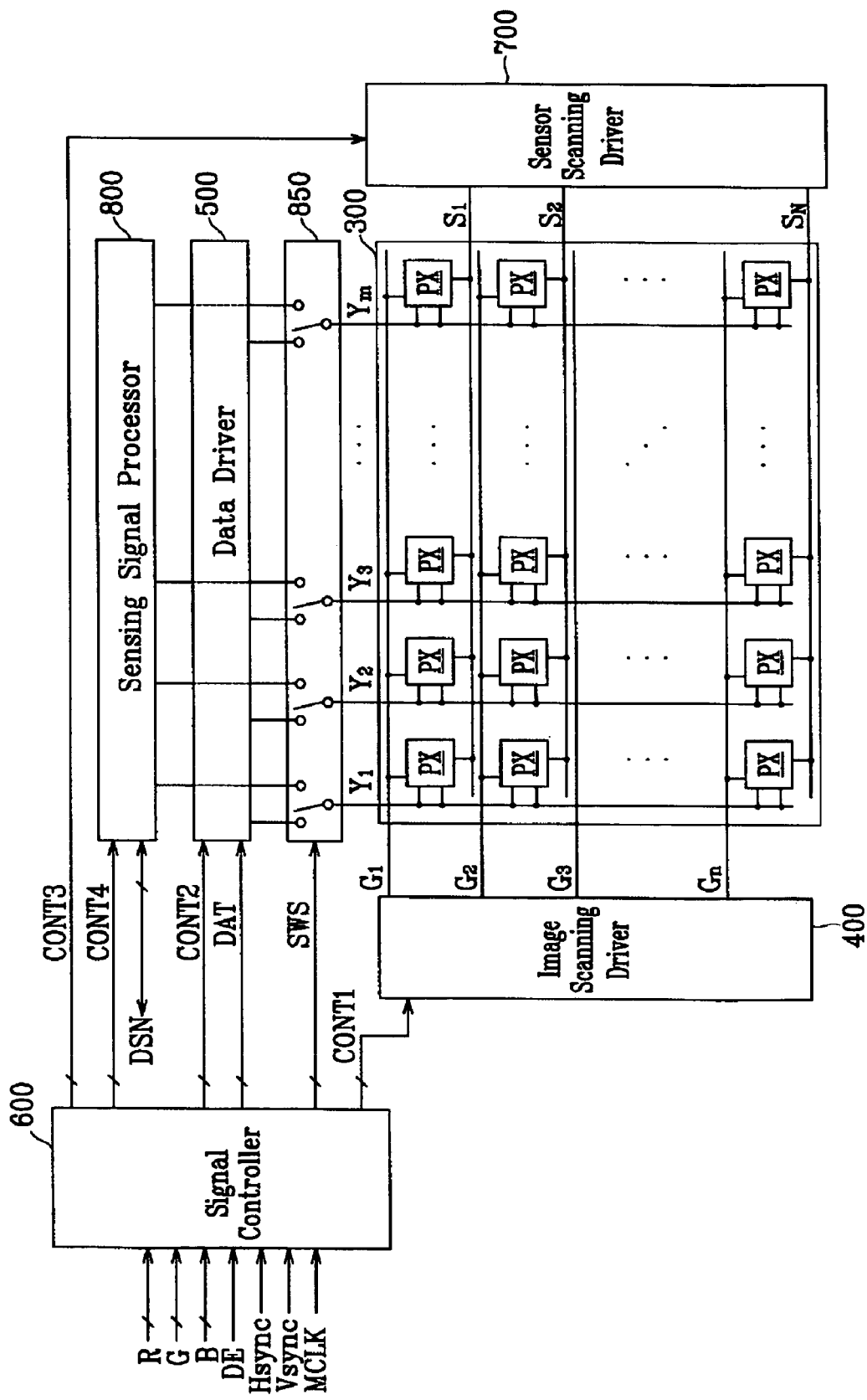
FIG. 6 is a block diagram of an LCD according to another embodiment of the present invention.
Figure 7:
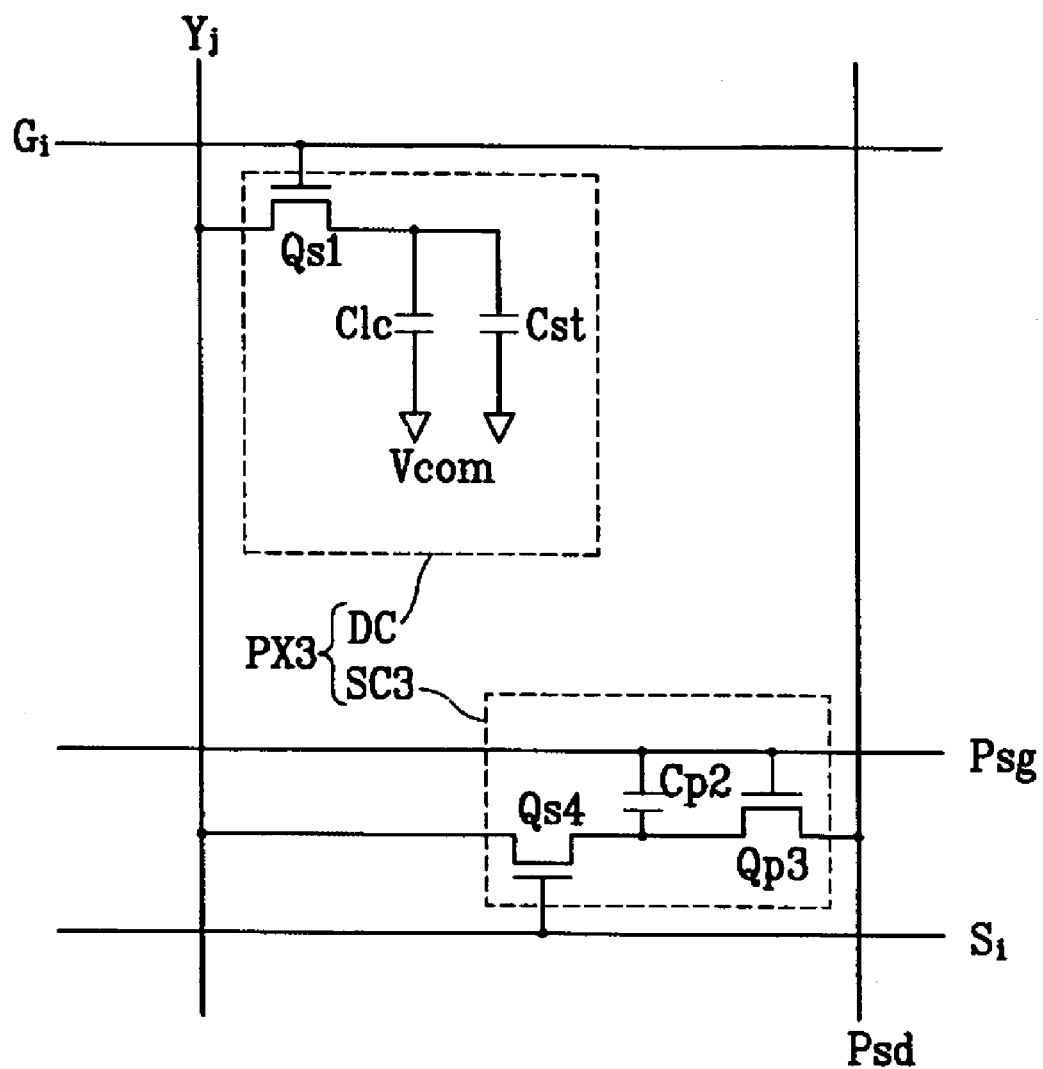
FIG. 7 is an equivalent circuit diagram of a pixel including a photo sensing circuit of an LCD according to another embodiment of the present invention.
Figure 8:
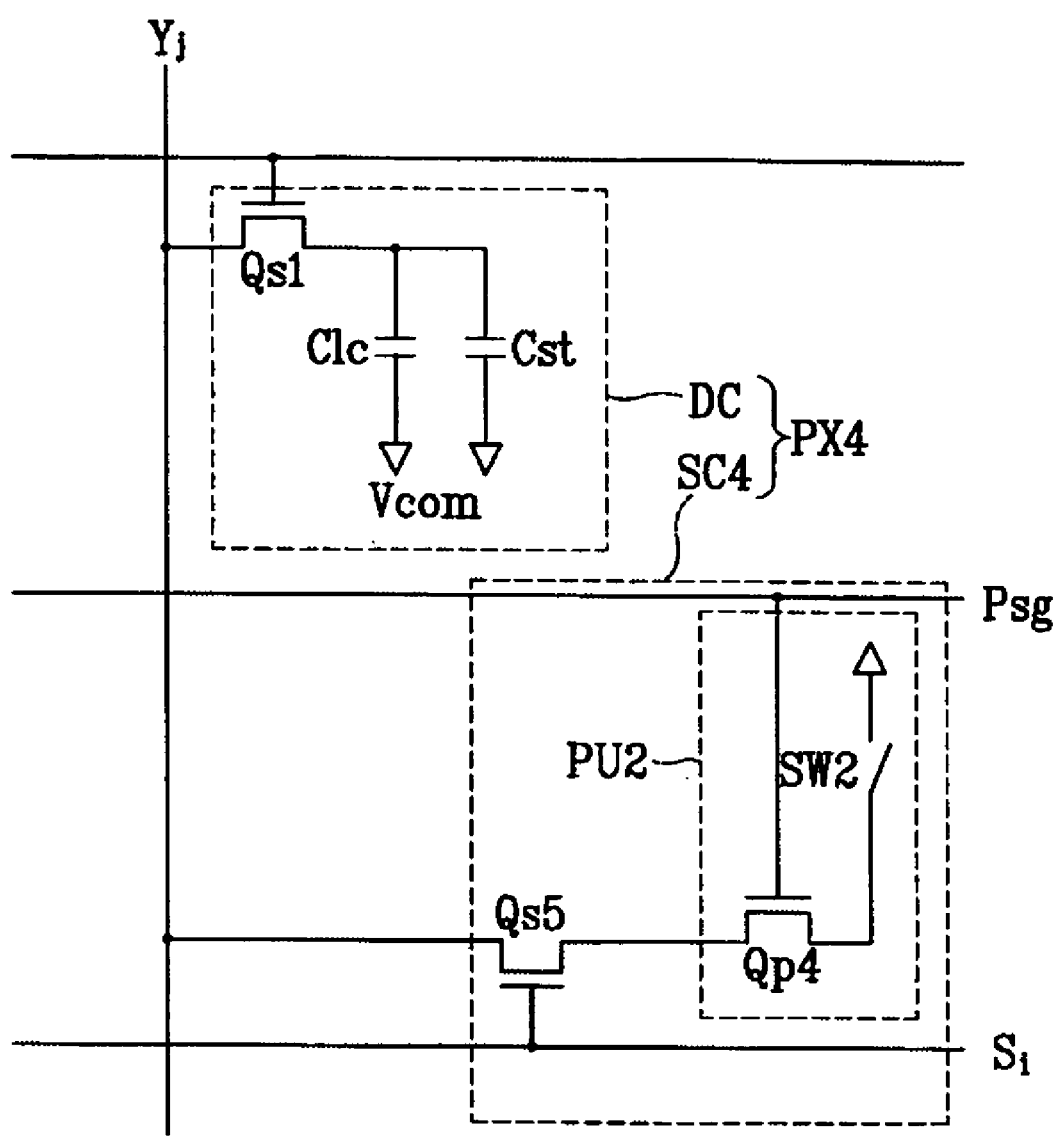
FIG. 8 is an equivalent circuit diagram of a pixel including a pressure sensing circuit of an LCD according to another embodiment of the present invention.
Figure 9:
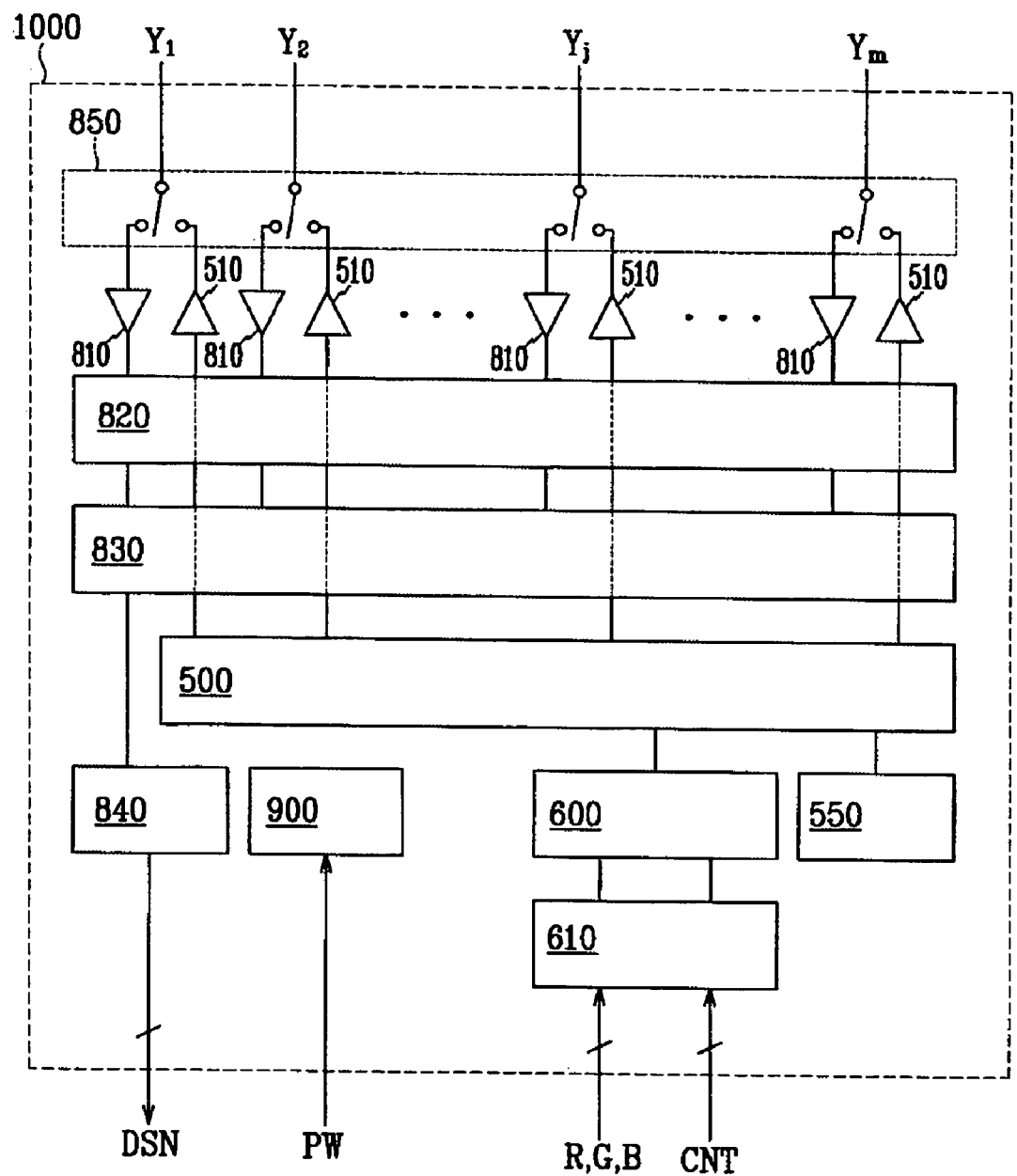
FIG. 9 is a block diagram of a complex integrated circuit (IC) including a driving device of an LCD according to another embodiment of the present invention.
Figure 10A:
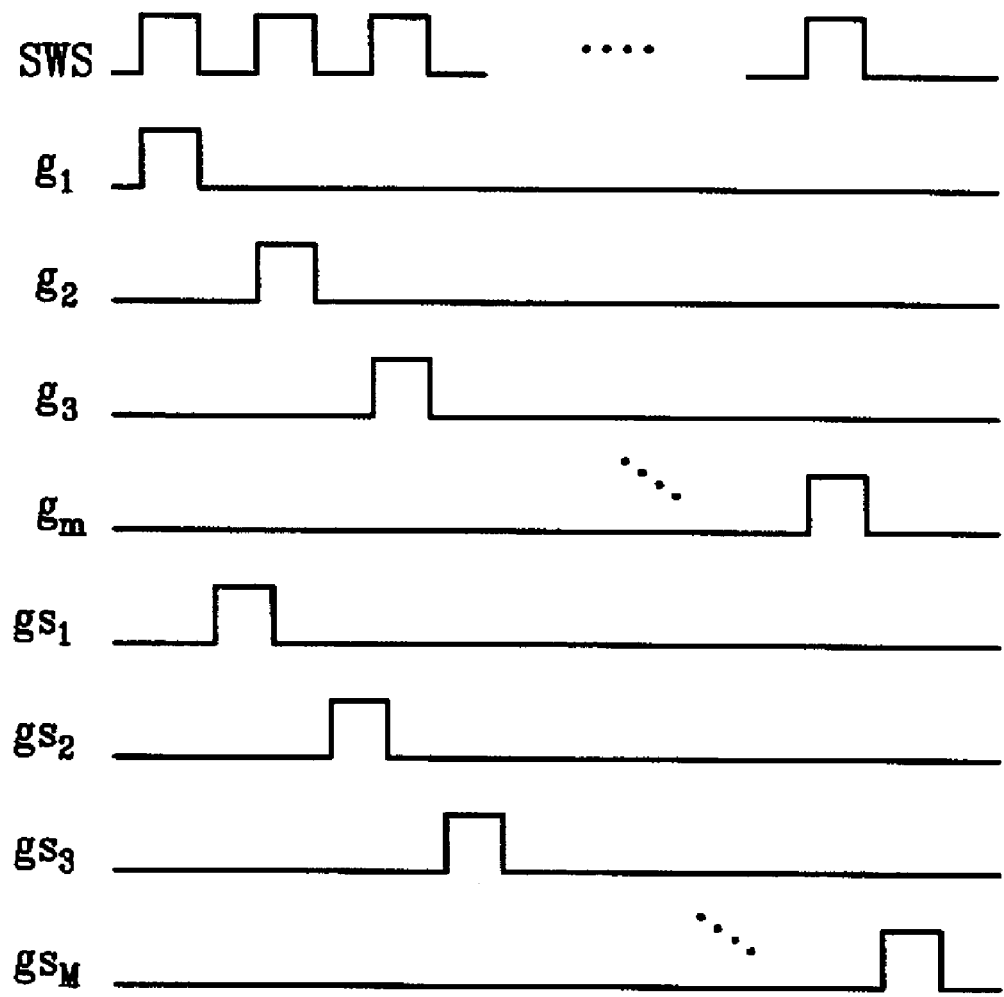

FIG. 6 is a block diagram of an LCD according to another embodiment of the present invention. FIG. 7 is an equivalent circuit diagram of a pixel including a photo sensing circuit of an LCD according to another embodiment of the present invention. FIG. 8 is an equivalent circuit diagram of a pixel including a pressure sensing circuit of an LCD according to another embodiment of the present invention. FIG. 9 is a block diagram of a complex integrated circuit (IC) including a driving device of an LCD according to another embodiment of the present invention. FIGS. 10A and 10B are exemplary timing charts illustrating various signals of an LCD including a complex IC chip.

Referring to FIG. 6, an LCD according to another embodiment includes a liquid crystal (LC) panel assembly 300, an image scanning driver 400, a sensor scanning driver 700, and a switching unit 850 that are coupled with the panel assembly 300, an image data driver 500 coupled with the switching unit 850, a sensing signal processor 800 coupled with the switching unit 850, a gray voltage generator 550 coupled with the image data driver 500, and a signal controller 600 controlling the above elements.

Referring to FIGS. 6-8, the panel assembly 300 includes a plurality of signal lines $G_1$-$G_n$, $Y_1$-$Y_m$, $S_1$-$S_N$, Psg, and Psd and a plurality of pixels PX connected to the signal lines $G_1$-$G_n$, $Y_1$-$Y_m$, $S_1$-$S_N$, Psg, and Psd and arranged substantially in a matrix.

The signal lines include a plurality of image scanning lines $G_1$-$G_n$ transmitting image scanning signals, a plurality of data lines $Y_1$-$Y_m$ transmitting image data signals and sensor data signals, a plurality of sensor scanning lines $S_1$-$S_N$ transmitting sensor scanning signals, a plurality of control voltage lines Psg transmitting a sensor control voltage, and a plurality of input voltage lines Psd transmitting a sensor input voltage.

The image scanning lines $G_1$-$G_n$ and the sensor scanning lines $S_1$-$S_N$ extend substantially in a row direction and substantially parallel to each other, while the image data lines $Y_1$-$Y_m$ extend substantially in a column direction and substantially parallel to each other.

Referring to FIGS. 7 and 8, each pixel PX, for example, a pixel PX3 or PX4 in the i-th row (i=1, 2, . . . , n) and the j-th column (j=1, 2, . . . , m) includes a display circuit DC connected to signal lines $G_i$ and $Y_j$ and a photo sensing circuit SC3 connected to signal lines $S_i$, $Y_j$, Psg and Psd or a pressure sensing circuit SC4 connected to sensor signal lines $S_i$, $Y_j$ and Psg. In some embodiments, not all of the pixels PX in the LC panel assembly 300 include the sensing circuits SC3 or SC4. In other words, the concentration of the sensing circuits SC3 and SC4 may vary. Thus, the number N of the sensor scanning lines $S_1$-$S_N$ may vary.

The sensing circuits SC3 and SC4 may be separated from the pixels PX and may be provided between the pixels PX or in a separately prepared area.

The display circuit DC includes a switching element Qs1 connected to an image scanning line $G_i$ and an image data line $Y_j$, and a LC capacitor Clc, and a storage capacitor Cst connected to the switching element Qs1.

The switching element Qs1 has three terminals: a control terminal connected to the image scanning line $G_i$, an input terminal connected to the image data line $Y_j$, and an output terminal connected to the LC capacitor Clc and the storage capacitor Cst.

The LC capacitor Clc includes a pair of terminals and a liquid crystal layer (not shown) interposed therebetween. The LC capacitor Clc is connected between the switching element Qs1 and a common voltage Vcom.

The storage capacitor Cst assists the LC capacitor Clc and is connected between the switching element Qs1 and a predetermined voltage such as the common voltage Vcom.

The photo sensing circuit SC3 shown in FIG. 7 includes a photo sensing element Qp3 connected to a control voltage line Psg and an input voltage line Psd, a sensor capacitor Cp2 connected to the photo sensing element Qp3, and a switching element Qs4 connected to a sensor scanning line $S_i$, the photo sensing element Qp3, and a data line $Y_j$.

The photo sensing element Qp3 has three terminals: a control terminal connected to the control voltage line Psg to be biased by the sensor control voltage, an input terminal connected to the input voltage line Psd to be biased by the sensor input voltage, and an output terminal connected to the switching element Qs4 and the capacitor Cp2. The photo sensing element Qp3 comprises a photoelectric material that generates a photocurrent upon exposure to light. An example of the photo sensing element Qp3 is a thin film transistor having an amorphous silicon or polysilicon channel that generates photocurrent. The sensor control voltage applied to the control terminal of the photo sensing element Qp3 is sufficiently low or sufficiently high so as to keep the photo sensing element Qp3 in an off state when no incident light is detected. The sensor input voltage applied to the input terminal of the photo sensing element Qp3 is sufficiently high or sufficiently low so as to keep the photocurrent flowing in a single direction. The sensor input voltage causes the photocurrent to flow toward the switching element Qs4. In addition, the photocurrent also flows into the sensor capacitor Cp2 to charge the sensor capacitor Cp2.

The sensor capacitor Cp2 is connected between the control terminal and the output terminal of the photo sensing element Qp3. The sensor capacitor Cp2 stores electrical charges output from the photo sensing element Qp3 to maintain a predetermined voltage. In other embodiments, the sensor capacitor Cp2 may be omitted.

The switching element Qs4 also has three terminals: a control terminal connected to the sensor scanning line $S_i$, an input terminal connected to the output terminal of the photo sensing element Qp3, and an output terminal connected to the data line $Y_j$. The switching element Qs4 outputs a sensor output signal to the data line $Y_j$ in response to the sensor scanning signal from the sensor scanning line $S_i$. The sensor output signal from the switching element Qs4 is a sensing current from the photo sensing element Qp3 or a current driven by voltage stored in the sensor capacitor Cp2.

The pressure sensing circuit SC4 shown in FIG. 8 includes a pressure sensing element PU2 connected to the common voltage Vcom and a control voltage line Psg, and a switching element Qs5 connected to a sensor scanning line $S_i$, the pressure sensing element PU2, and a data line $Y_j$.

The pressure sensing element PU2 includes a pressure switch SW2 connected to the common voltage Vcom and a driving transistor Qp4 connected between the switch SW2 and the switching element Qs5.

The pressure applied to the pressure switch SWs caused by a touch exerted on the panel assembly 300 causes the pressure switch SW2 to connect the driving transistor Qp4 to the common voltage Vcom. For example, the pressure may make an electrode (not shown) supplied with the common voltage Vcom approach a terminal of the driving transistor Qp4 to be in contact therewith. Alternatively, the switch SW2 may use another physical mechanism for connecting the driving transistor Qp4 to the common voltage Vcom.

The driving transistor Qp4 has three terminals: a control terminal connected to the control voltage line Psg to be biased by the sensor control voltage, an input terminal connected to the switch SW2, and an output terminal connected to the switching element Qs5. The driving transistor Qp4 generates and outputs an electrical current upon receipt of the common voltage Vcom from the switch SW2.

The switching element Qs5 also has three terminals: a control terminal connected to the sensor scanning line $S_i$, an input terminal connected to the output terminal of the driving transistor Qp4, and an output terminal connected to the data line $Y_j$. The switching element Qs5 outputs the current from the driving transistor Qp4 to the data line $Y_j$ as a sensor output signal in response to the sensor scanning signal from the sensor scanning line $S_i$.

One or more polarizers (not shown) are provided at the panel assembly 300.

The switching unit 850 is coupled with the image data lines $Y_1$-$Y_m$ of the panel assembly 300 and connects the image data lines $Y_1$-$Y_m$ to either the image data driver 500 or the sensing signal processor 800.

The image scanning driver 400 is connected to the image data lines $Y_1$-$Y_m$ of the panel assembly 300 and synthesizes a gate-on voltage and a gate-off voltage to generate the image data signals for application to the image data lines $Y_1$-$Y_m$.

The image data driver 500 is coupled with the switching unit 850 and applies image data signals selected from the gray voltages to the image data lines $Y_1$-$Y_m$ through the switching unit 850.

The sensor scanning driver 700 is connected to the sensor scanning lines $S_1$-$S_N$ of the panel assembly 300 and synthesizes a gate-on voltage and a gate-off voltage to generate the sensor scanning signals for application to the sensor scanning lines $S_1$-$S_n$.

The sensing signal processor 800 is coupled with the switching unit 850 and receives the sensor data signals from the data lines $Y_1$-$Y_m$ through the switching unit 850. The sensing signal processor 800 converts the analog sensor data signals from the data lines $Y_1$-$Y_m$ into digital signals to generate digital sensor data signals DSN. The sensor data signals carried by the data lines $Y_1$-$Y_m$ may comprise current signals and in this case, the sensing signal processor 800 converts the current signals into voltage signals before the analog-to-digital conversion. One sensor data signal carried by one data line $Y_1$-$Y_m$ at a time may include one sensor output signal from one switching element Qs4 or may include at least two sensor output signals outputted from at least two switching elements Qs4.

The signal controller 600 controls the image scanning driver 400, the image data driver 500, the sensor scanning driver 700, the sensing signal processor 800, and the switching unit 850.

Each of the processing units 400, 500, 600, 700, 800, and 850 may comprise at least one integrated circuit (IC) chip mounted on the LC panel assembly 300 or on a flexible printed circuit (FPC) film in a tape carrier package (TCP) type, which are attached to the panel assembly 300. Alternatively, at least one of the processing units 400, 500, 600, 700, 800, and 850 may be integrated into the panel assembly 300 along with the signal lines $G_1$-$G_n$, $Y_1$-$Y_m$, $S_1$-$S_N$, Psg, and Psd, the switching elements Qs1, Qs4, and Qs5, and the photo sensing elements Qp3. Alternatively, all the processing units 400, 500, 600, 700, 800, and 850 may be integrated into a single IC chip. Alternatively, at least one of the processing units 400, 500, 600, 700, 800 and 850 or at least one circuit element in at least one of the processing units 400, 500, 600, 700, 800 and 850 may be disposed outside of the single IC chip.

As shown in FIG. 9, the data driver 500, the sensing signal processor 800, the switching unit 850, and the signal controller 600 are integrated into a complex IC 2000. The complex IC 2000 may be implemented as a single chip.

A complex IC 2000 shown in FIG. 9 includes a gray voltage generator 550, an image data driver 500, a plurality of output buffers 510, a plurality of amplifiers 810, a sample and hold circuit 820, a parallel-to-serial converter 830, an analog-to-digital converter 840, a switching unit 850, an interface 610, a signal controller 600, and a power unit 900.

The switching unit 850 is coupled with data lines $Y_1$-$Y_m$, and includes a plurality of switches that connect the data lines $Y_1$-$Y_m$ to either of the output buffers 510 and the amplifiers 810.

The output buffers 510 output image data voltages from the image data driver 500 to the data lines $Y_1$-$Y_m$ through the switching unit 850.

The amplifier 810 amplifies sensor data signals from the data lines $Y_1$-$Y_m$ through the switching unit 850. These amplified sensor data signals are passed on to the parallel-to-serial converter 830.

The number of switches in the switching unit 850 may be determined by the resolution of rows of the sensing circuits SC3 and SC4. In the above-described examples, when both the resolutions of the LCD and the sensing circuits are equivalent to QVGA, the number of output buffers 510 is three times the number of amplifiers 810 and switches. Thus, two-thirds of the data lines $Y_1$-$Y_m$ are not coupled with any switches and may be directly connected to the output buffers 510.

The functions of other elements of the complex IC 2000 are substantially the same as those shown in FIG. 4, and the detailed description thereof will be omitted.

In this embodiment, the number of signal lines is reduced to increase the aperture ratio of the pixels PA and to reduce the number of the input/output terminals of the complex IC 2000.

The operation of the LCD shown in FIGS. 6-9 will be described in detail below.

The signal controller 600 generates a switching signal SWS based on input control signals CNT and supplies the switching signal SWS to the switching unit 850.

When the switching signal SWS is in a high level, the switching unit 850 activates the switches to connect the data lines $Y_1$-$Y_m$ to the output buffers 510. In contrast, when the switching signal SWS is in a low level, the switching unit 850 activates the switches to connect the data lines $Y_1$-$Y_m$ to the amplifiers 810. As described above, there may be fewer amplifiers 810 than output buffers 510, so some of the data lines $Y_1$-$Y_m$ are not connected to switches and maintain a constant connection to respective output buffers 510.

Responsive to the image data control signals CONT2, the image data driver 500 receives a packet of the digital image signals DAT for the group of pixels PX and converts the digital image signals DAT into analog image data signals. The image data driver 500 applies the analog image data signals to the image data lines $Y_1$-$Y_m$ through the output buffers 510 and the switching unit 850 while the switching signal SWS is in the high level.

The image scanning driver 400 makes supplies scanning signals $g_1$-$g_n$ in a high level in response to the image scanning control signals CONT1 from the signal controller 600. This turns on the switching transistors Qs1 connected to the image scanning lines $G_1$-$G_n$ during the high level period of the switching signal SWS. The image data signals applied to the image data lines $Y_1$-$Y_m$ are then supplied to the display circuit DC of the pixels PX through the activated switching transistors Qs1.

The sensor scanning driver 700 make sensor scanning signals $gs_1$-$gs_N$ in a high level to turn on the switching elements Qs4 and Qs5 connected to the sensor scanning lines $S_1$-$S_N$ in response to the sensing control signals CONT3 during the low level period of the switching signal SWS. Then, the switching elements Qs4 and Qs5 output sensor output signals to the data lines $Y_1$-$Y_m$ to form sensor data signals. The sensor data signals are input into the sensing signal processor 800.

The sensing signal processor 800 reads the sensor data signals from the amplifiers 810 during the low level period of the switching signal SWS and processes the read sensor data signals in response to the sensor data control signals CONT4.

An example of the image scanning signals $g_1$-$g_n$ and the sensor scanning signals $gs_1$-$gs_N$ is shown in FIG. 10A.

The switching signal SWS shown in FIG. 10A have a high level and a low level in a 1H period. When both the resolutions of the LCD and the sensing circuits are equivalent to QVGA, the image scanning signals $g_1$-$g_n$ and the sensor scanning signals $gs_1$-$gs_N$ become alternately high to alternate between the application of the image data signals for display operation and the reception of the sensor data signals for sensing operation. When the resolution of the LCD is equivalent to QVGA, and the resolution of the sensing circuits C1 and C2 is equivalent to QQVGA, a sensor scanning signal $gs_1$-$gs_N$ becomes high whenever two the image scanning signals $g_1$-$g_n$ become high.

Another example of the image scanning signals $g_1$-$g_n$ and the sensor scanning signals $gs_1$-$gs_N$ is shown in FIG. 10B.

In the example shown in FIG. 10B, after all the image scanning signals $g_1$-$g_n$ become high in sequence, then the sensor scanning signals $gs_1$-$gs_N$ become high in sequence. In this case, the switching signal SWS has a period of one frame.

During a frame, all the image scanning lines $G_1$-$G_n$ and all the sensor scanning lines $S_1$-$S_N$ are supplied with the image scanning signals $g_1$-$g_n$ and the sensor scanning signals $gs_1$-$gs_N$. However, in other embodiments the sensing operation shown in FIG. 10A or FIG. 10B may be performed every two or more frames.

The ratio of the high level periods and of the low level periods of the switching signal SWS shown in FIGS. 10A and 10B may vary.

The switching unit 850 may integrated into the panel assembly 300 separate from the complex IC 2000.

The complex ICs 1000 and 2000 may be employed in other types of flat panel displays, such as an organic light emitting diode (OLED) display and a plasma display panel (PDP).

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A device for driving a display device including a plurality of display circuits, a plurality of sensing circuits, and a plurality of data lines connected to the display circuits and the sensing circuits, the device comprising:

an image data driver converting image signals into image data signals and applying the image data signals to the data lines, the image data driver comprising a first terminal;

a sensing signal processor receiving analog sensor data signals from the data lines and processing the sensor data signals to generate digital sensor data signals, the sensing signal process comprising a second terminal;

a switching unit coupled to at least one of the data lines, wherein the switching unit selectively connects the at least one of the data lines to either the first terminal or the second terminal; and a signal controller receiving the image signals and controlling the image data driver and the sensing signal processor.

2. The device of claim 1, wherein the sensing signal processor comprises:
a plurality of amplifiers amplifying the analog sensor data signals;
a sample and hold circuit filtering the amplified analog sensor data signals and performing a sample-and-hold operation on the filtered analog sensor data signals; and
an analog-to-digital converter converting the analog sensor data signals into the digital sensor data signals.

3. The device of claim 2, further comprising a parallel-to-serial converter converting the analog sensor data signals from the sample and hold circuit.

4. The device of claim 2, wherein the image data driver comprises a plurality of output buffers outputting the image data signals.

5. The device of claim 1, wherein the image data driver, the sensing signal processor, and the signal controller are integrated in a single integrated circuit chip.

6. The device of claim 5, further comprising an image scanning driver integrated into the integrated circuit chip and supplying image scanning signals to the display circuits.

7. The device of claim 5, further comprising a sensor scanning driver integrated into the integrated circuit chip and supplying sensor scanning signals to the sensing circuits.

8. The device of claim 1, wherein the sensing circuits comprise photo sensing circuits and pressure sensing circuits that sense a touch.

9. A display device comprising:
a plurality of display circuits displaying images;
a plurality of sensing circuits sensing physical quantity;
a plurality of data lines connected to the display circuits and the sensing circuits;
an image data driver converting image signals into image data signals and applying the image data signals to the data lines, the image data driver comprising a first terminal;
a sensing signal processor receiving analog sensor data signals from the data lines and processing the sensor data signals to generate digital sensor data signals, the sensing signal process comprising a second terminal;
a switching unit coupled to at least one of the data lines, wherein the switching unit selectively connects the at least one of the data lines to either the first terminal or the second terminal; and
a signal controller receiving the image signals and controlling the image data driver and the sensing signal processor.

10. The display device of claim 9, wherein the sensing signal processor comprises:
a plurality of amplifiers amplifying the analog sensor data signals;
a sample and hold circuit filtering the amplified analog sensor data signals and performing a sample-and-hold operation on the filtered analog sensor data signals; and
an analog-to-digital converter converting the analog sensor data signals into the digital sensor data signals.

11. The display device of claim 10, further comprising a parallel-to-serial converter converting the analog sensor data signals from the sample and hold circuit.

12. The display device of claim 10, wherein the image data driver comprises a plurality of output buffers outputting the image data signals.

13. The display device of claim 9, wherein the image data driver, the sensing signal processor, and the signal controller are integrated in a single integrated circuit chip.

14. The display device of claim 9, wherein a distance between two adjacent data is from about 0.1 mm to about 5.0 mm.

15. A device for driving a display device including a plurality of display circuits, a plurality of sensing circuits, the device comprising:
a single integrated circuit chip which includes at least one output terminal and at least one input terminal, the integrated circuit chip converting image signals into image data signals, processing sensor data signals to generate digital sensor data signals, and controlling the image data signals and the digital sensor data signals;
wherein the image data driver that converts image signals into image data signals comprises a first terminal and a sensing signal processor that processes sensor data signals to generate digital sensor data signals comprises a second terminal; a switching unit coupled to at least one of the data lines, wherein the switching unit selectively connects the at least one of the data lines to either the first output terminal of the integrated circuit chip and the display circuits or the second input terminal of the integrated circuit chip and the sensing circuits.

16. The device of claim 15, wherein the integrated circuit chip comprises:
a plurality of amplifiers amplifying analog sensor data signals;
a sample and hold circuit filtering the amplified analog sensor data signals and performing a sample-and-hold operation on the filtered analog sensor data signals; and
an analog-to-digital converter converting the analog sensor data signals into the digital sensor data signals.

17. The device of claim 16, further comprising a parallel-to-serial converter converting the analog sensor data signals from the sample and hold circuit.

18. The device of claim 16, wherein the integrated circuit chip comprises a plurality of output buffers outputting the image data signals.

19. The device of claim 15, wherein the sensing circuits comprise photo sensing circuits and pressure sensing circuits that sense a touch.

* * * * *